No. 648,187.  
Patented Apr. 24, 1900.  
J. E. BRIGHT.  
HOSE COUPLING.  
(Application filed Jan. 4, 1900.)

(No Model.)

Witnesses  
M. McGinnis  
M. C. Wilkinson

Inventor  
Joseph E. Bright  
By Hazard & Harpham  
Attorneys

UNITED STATES PATENT OFFICE.

JOSEPH E. BRIGHT, OF LOS ANGELES, CALIFORNIA.

HOSE-COUPLING.

SPECIFICATION forming part of Letters Patent No. 648,187, dated April 24, 1900.

Application filed January 4, 1900. Serial No. 381. (No model.)

*To all whom it may concern:*

Be it known that I, JOSEPH E. BRIGHT, a citizen of the United States, residing at Los Angeles, in the county of Los Angeles, State of California, have invented new and useful Improvements in Hose-Couplings, of which the following is a specification.

My invention relates to hose-couplers; and my object is to produce a device of this character which provides a water-tight joint by means of a washer having a flange interposed between the male and female members of the coupler, which washer is held on the male member of the coupler and against accidental displacement by having the flange thereof slipped over the flange on the male member and which can easily be removed therefrom. I accomplish this object by the device described herein and illustrated in the accompanying drawings, forming a part hereof, in which—

Figure 1:
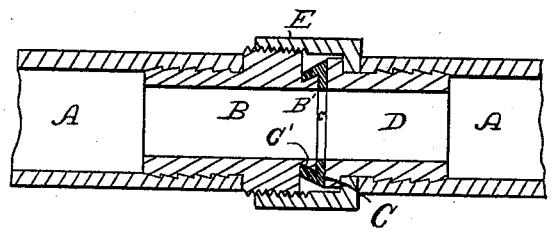
Figure 2:
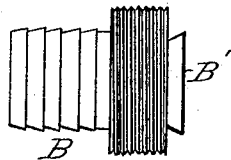

Figure 1 is a cross-section of a piece of hose and my improved coupler. Fig. 2 is a side view of the male member of my coupler.

In the drawings, A is the hose. B is the externally-threaded male member of my coupler, the inner end of which—that is, the end which approaches the female member—terminates in an inverted-cone-shaped flange B' of less diameter than the threaded portion, over which flange the flange C' of the washer C, of rubber or other equivalent material, slips. These flanges hold the washer securely against accidental separation from the male member of the coupler, and the washer is thereby always in place ready for use when it is desired to couple the sections of the hose together or to a nozzle or a sprinkler. The female member D is provided with the usual internally-threaded coupling-nut E, which screws upon the threaded male member in the usual manner and holds the members of the coupler together.

When hose is provided with my improved coupling, the end of the hydrant (not shown) to which the hose is coupled should be of the same construction as the end of the male member of the coupler which couples with the female member that is threaded and terminating in the inverted-cone-shaped flange B', over which the flange of washer C is slipped to provide a water-tight joint when the hose is coupled thereon.

Having described my invention, what I claim is—

1. A hose-coupling comprising a male member externally threaded and terminating in the end approaching the female member in an inverted-cone-shaped flange of less diameter than the threaded portion; and a female member provided with an internally-threaded coupling-nut, substantially as described herein.

2. The combination of a hose-coupling, comprising a male member externally threaded and terminating, in the end approaching the female member, in an inverted-cone-shaped flange of less diameter than the threaded portion; and a female member provided with an internally-threaded coupling-nut with a washer having a flange adapted to fit over the flange on the male member of the coupling.

3. A hose-coupling, comprising a male member B, having flange B'; female member D, having coupling-nut E in combination with washer C, having a flange C' adapted to fit over the flange of the male member of the coupling.

4. The combination of a hydrant terminating at the hose-attaching end thereof in an inverted-cone-shaped flange of less diameter than the threaded portion; a washer having a flange adapted to fit over the flange on the hydrant; the female member of the coupling; and a section of hose attached to said female member, substantially as described herein.

In witness that I claim the foregoing I have hereunto subscribed my name, this 29th day of December, 1899, at Los Angeles, California.

JOSEPH E. BRIGHT.

Witnesses:
G. E. HARPHAM,
MATT MCGINNIS.